United States Patent Office 3,574,825
Patented Apr. 13, 1971

3,574,825
SUNSCREEN COMPOSITIONS CONTAINING POLYMETHYLATED MUCONIC ACIDS
Oscar L. Norman, Wilmington, Del., assignor to Sun Oil Company, Philadelphia, Pa.
No Drawing. Filed Dec. 18, 1967, Ser. No. 691,152
Int. Cl. A61l 23/00
U.S. Cl. 424—59      12 Claims

ABSTRACT OF THE DISCLOSURE

A composition for application to the human skin for protection against erythematogenic radiation which comprises a cosmetic base carrier containing 1.0 to 15.0 weight percent of certain polymethylated muconic acids or their hydrocarbyl esters, said acids being selected from the group consisting of $\alpha,\alpha'$-dimethylmuconic acid, $\alpha,\beta'$-dimethylmuconic acid, $\alpha,\alpha',\beta$-trimethylmuconic acid, $\alpha,\beta,\beta'$-trimethylmuconic acid, and $\alpha,\alpha'$-$\beta,\beta'$-tetramethylmuconic acid, and to methods of preparing said compositions.

BACKGROUND OF THE INVENTION

The present invention relates to novel compositions which provide human skin with protection against erythematogenic radiation.

Specifically, this invention relates to novel sun-screen compositions containing certain polymethylated muconic acids and their muconates which are effective in protecting human skin from erythema solare.

Erythema solare, more commonly referred to as sunburn, is defined as erythema due to excessive exposure of the human skin to the ultraviolet spectrum of the sun or artificial radiation such as that produced by mercury arc lamps.

It is generally known that protection against erythema solare can be achieved by coating the area of skin to be exposed with compositions which are commonly referred to as sun-screen agents.

The primary function of an effective sun-screening composition is the substantial absorption of radiant energy in the ultra-violet portion of the spectrum lying between approximately 250 millimicrons and 320 millimicrons. Generally sun-screening compositions comprise a sun-screening agent dispersed in a prepared composition such as lotions, creams, dispersions, and emulsions. Non-polar solvents or carriers commonly employed in the formulation of cosmetic products, are normally used in the preparation of the cosmetic sun-screening product.

Heretofore, many organic compositions have been proposed as sun-screening agents, some of which have proven to be effective for their intended purpose.

DESCRIPTION OF THE INVENTION

It has now been discovered that certain di-, tri-, and tetramethylmuconic acids hereafter referred to as polymethylated muconic acids, and their hydrocarbyl esters provide effective protection against solare erythema.

Specifically, it has been discovered that cis-cis, cis-trans, and trans-trans isomers of $\alpha,\alpha'$-dimethylmuconic acid, $\alpha,\beta'$-dimethylmuconic acid, $\alpha,\alpha',\beta$-trimethylmuconic acid, $\alpha,\beta,\beta'$-trimethylmuconic acid, $\alpha,\alpha',\beta,\beta'$-tetramethylmuconic acid, or their monoesters wherein one carboxyl group is attached to a $C_1$-$C_{20}$ hydrocarbyl radical, or their diesters wherein each carboxyl group is attached to a $C_1$-$C_{20}$ hydrocarbyl radical and mixtures thereof, when topically applied to human skin dispersed in an inert carrier provide protection against erythematogenic radiation.

Each of the above-disclosed polymethylated muconic acids in the cis-cis, cis-trans, or trans-trans isomeric form or mixtures thereof is effective for use in the compositions of the present invention. Also, the $C_1$-$C_{20}$ hydrocarbyl monoesters or diesters of these acids or mixtures thereof are effective for use in the compositions of the present invention.

The $C_1$-$C_{20}$ hydrocarbyl esters included in the present invention are selected from the hydrocarbyl radicals of $C_1$-$C_{20}$ hydrocarbons having acyclic, cyclic, and aromatic structures such as those disclosed in the text "Handbook of Hydrocarbons," S. W. Ferris, Academic Press Inc., New York, N.Y. (1955), pages 145–249, all of which are incorporated herein by reference. The preferred esters of the present invention are the $C_1$-$C_{10}$ hydrocarbyl mono- and diesters of the polymethylated muconic acids disclosed above. Examples of the $C_1$-$C_{10}$ hydrocarbyl groups include methyl, ethyl, propyl, butyl, pentyl, hexyl, heptyl, octyl, nonyl, decyl cyclopentyl, methyl cyclopentyl, dicyclopentyl, cyclohexyl, phenyl, tolyl, xylyl, naphthyl, tetrahydronaphthyl, decahydronaphthyl, as well as the various isomers of each.

The diester of the muconic acid can be a mixed ester. An illustrative example is the cis-cis isomer of $\alpha,\alpha'$-dimethylmuconic acid which can be illustrated by the following structural formula:

$$\begin{array}{c} H_3C \\ \phantom{x} \diagdown \\ \phantom{xxx} C=C \\ R_1OOC \diagup \phantom{xxx} \diagdown \\ \phantom{xxxxxxxx} C=C \\ \phantom{xxxxxxxxxx} H \diagup \phantom{xx} \diagdown CH_3 \end{array} \quad \begin{array}{c} H \\ \diagup \\ \phantom{xx} COOR_2 \\ \diagup \end{array}$$

wherein $R_1$ is different from $R_2$. That is to say, $R_1$ can be a hydrocarbyl group of $C_1$-$C_{20}$ and $R_2$ can be a different hydrocarbyl group of $C_1$-$C_{20}$, e.g., $R_1$ equals cyclohexyl ($C_6$) and $R_2$ equals eicosyl ($C_{20}$).

Examples of some of the esters of the polymethylated muconic acids suitable for use in the compositions of the present invention include the cis-cis, cis-trans, and trans-trans isomers of the mono- and di-methyl esters of $\alpha,\beta'$-dimethylmuconic acid; the mono- and di-phenyl esters of $\alpha,\alpha',\beta,\beta'$-tetramethylmuconic acid; the mono- and di-naphthyl esters of $\alpha,\beta,\beta'$-trimethylmuconic acid; the mono- and di-5,6-diethylacenaphthyl esters of $\alpha,\alpha'$-dimethylmuconic acid; the mono- and di-cyclohexyl esters of $\alpha,\alpha'$-dimethylmuconic acid; the mono- and di-1,2-dimethylcycloheptyl esters of $\alpha,\beta'$-dimethylmuconic acid; the mono- and di-decahydronaphthyl esters of $\alpha,\alpha',\beta,\beta'$-tetramethylmuconic acid; the mono- and di-1,3-dipropylbenzyl esters of $\alpha,\alpha'$-dimethylmuconic acid; the mono- and di-2,9-dimethyl-4,7-diisobutyldecyl esters of $\alpha,\alpha',\beta$-trimethylmuconic acid; and the mono- and di-cycloeicosyl esters of $\alpha,\beta'$-dimethylmuconic acid; the mono- and di-2,6,10-trimethyl dodecyl esters of $\alpha,\alpha',\beta,\beta'$-tetramethylmuconic acid; and the nonyl ethyl esters of $\alpha,\alpha',\beta$-trimethylmuconic acid.

Specifically, it has now been discovered that the cis-cis, cis-trans, or trans-trans isomers of the following compounds provide effective sun-screen compositions when dispersed in inert cosmetic base carriers. These sun-screen additives are selected from (a) polymethylated muconic acids selected from the group consisting of $\alpha,\alpha'$-dimethylmuconic acid, $\alpha,\beta'$-dimethylmuconic acid, $\alpha,\alpha',\beta$-trimethylmuconic acid, $\alpha,\beta,\beta'$-trimethylmuconic acid, and $\alpha,\alpha',\beta,\beta'$-tetramethylmuconic acid.

(b) the hydrocarbyl monoesters of said diacids wherein the hydrocarbyl group contains 1–20 carbon atoms, (c) hydrocarbyl diesters of said diacids wherein each hydrocarbyl contains 1–20 carbon atoms, and (d) mixtures of any of the above.

As noted above, polymethylated muconic acids can exist in three isomeric forms, viz, cis-cis, trans-trans, and cis-trans. As an example, the unsaturated diacid, $\alpha,\alpha'$-dimethylmuconic acid, can be depicted by the following structural formulas:

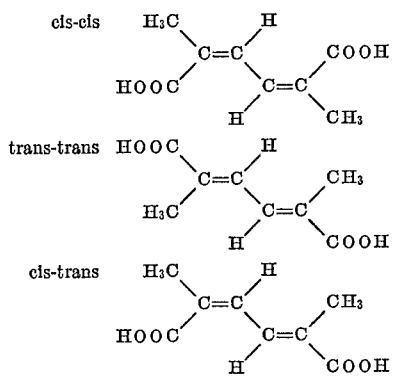

The preparation of each of these isomeric forms of the α,α'-dimethylmuconic acid has been described in the prior art by Elvidge et al., J. Chem. Soc., pages 1026–1033 (1952). These authors show that oxidation of p-xylenol by means of peracetic acid gave the cis-cis form of the acid. The other isomeric forms were obtained indirectly by conversion of the cis-cis form. Also dimethyl esters of each of the three isomeric forms were prepared by shaking the respective DMMA with ethereal diazomethane.

The cis-cis form of these certain polymethylated muconic acids can also be obtained by biological oxidation of p-xylene utilizing special strains of mircroorganisms as disclosed in U.S. application Ser. No. 509,621, filed Nov. 24, 1965 and now U.S. Pat. No. 3,383,289 issued May 14, 1968.

Procedures for recovering esters of the three isomeric forms of methylated muconic acids usable in the compositions of the present invention are also disclosed in U.S. application Ser. No. 561,736, filed June 30, 1966 and now U.S. Pat. No. 3,440,158 issued Apr. 28, 1969.

Carrier compositions for the sun-screening compounds of the present invention can be any of the well known formulations normally used with human skin. These carrier compositions can include such standard components as glycerine, diethylene glycol, mineral oil, petrolatum, petroleum wax, cocoa butter, vegetable oils, lanolin, stearic acid, cetyl alcohol, and solvents such as ethanol, isopropanol, water and others. General formulations for sun-screen carrier base compositions and their methods of preparation are disclosed in Bennett's Chemical Formula, vol. VIII, pages 51–54, Chemical Pub. Co., Brooklyn, N.Y. (1948). The sun-screen compositions of the present invention include lotions, creams, emulsions, and paste formulations.

As a means of illustrating one mode of the present invention, the following examples are given of sun-screen formulations:

EXAMPLE I

A sun-screen composition effective for protection of human skin against erythematogenic radiation was prepared as follows:

Forty milliliters of ethanol solution containing 10 grams of cis-cis α,α'-dimethylmuconic acid was blended with a cosmetic lotion base of the following composition:

| | Grams |
|---|---|
| Diethylene glycol monostearate | 2.0 |
| Stearic acid | 1.5 |
| Cetyl alcohol (pure) | 0.5 |
| Benzyl alcohol | 0.6 |
| Triethanol amine | 1.0 |
| Distilled water | 54.4 |

EXAMPLE II

A sample of the dimethyl ester of trans-trans α,α'-dimethylmuconic acid was prepared as follows:

A solution of 150 g. (0.88 mol.) of cis-cis dimethylmuconic acid obtained by biological oxidation of p-xylene and dissolved in 1 liter of 6 N NaOH is refluxed for 24 hours, diluted with 5 volumes of distilled water, and brought to pH 3 with 12 N HCl. The solid which separates at this point is filtered off and dried; it contains about 80% of the trans-trans acid, with a lesser amount of the cis-trans acid and a minor amount of the cis-cis acid.

The crude product thus obtained is esterified by refluxing it (140 g.) in 1 liter of methanol containing 1 cc. of concentrated $H_2SO_4$ until solution occurs. Cooling the reaction mixture yields the dimethyl ester of the trans-trans acid in substantially pure form (M.P. 102–104° C.).

A sun-screen composition equally effective as that disclosed in Example I was prepared in the identical manner as disclosed in Example I with the exception that the ethanol solution added to the cosmetic base consisted of 20 milliliters of a solution consisting of 10 grams of the dimethyl ester of trans-trans α,α'-dimethylmuconic acid prepared as disclosed above.

The polymethylated muconic acids and their hydrocarbyl esters are effective as sun-screen agents when applied as a 1.0–15.0 weight percent concentration in a cosmetic base carrier of the type generally described above. The preferred concentration range of sun-screen agent in the cosmetic carrier is 5–10 weight percent based on the weight of the whole composition.

I claim:
1. A composition for application to human skin for protection against erythematogenic radiation which comprises a cosmetic lotion base carrier containing 1.0–15.0 weight percent of a sunscreen agent selected from the group consisting of
  (a) polymethylated muconic acids selected from the group consisting of α,α'-dimethylmuconic acid, α,β'-dimethylmuconic acid, α,α',β-trimethylmuconic acid, α,β,β'-trimethylmuconic acid, and α,α',β,β'-tetramethylmuconic acid,
  (b) hydrocarbyl monoesters of said muconic acid wherein the hydrocarbyl group contains 1–20 carbon atoms and,
  (c) hydrocarbyl diesters of said muconic acids wherein the hydrocarbyl groups contain 1–20 carbon atoms.
2. A composition according to claim 1 wherein the polymethylated muconic acids are the cis-cis isomers.
3. A composition according to claim 1 wherein the polymethylated muconic acids are the cis-trans isomers.
4. A composition according to claim 1 wherein the polymethylated muconic acids are the trans-trans isomers.
5. A composition according to claim 1 wherein the quantity of sun-screen agent is in the range of 5.0–10.0 weight percent.
6. A composition according to claim 2 wherein the quantity of sun-screen agent is in the range of 5.0–10.0 weight percent.
7. A composition according to claim 3 wherein the quantity of sun-screen agent is in the range of 5.0–10.0 weight percent.
8. A composition according to claim 4 wherein the quantity of sun-screen agent is in the range of 5.0–10.0 weight percent.
9. A composition according to claim 4 wherein the sun-screen agent is the dimethyl ester of α,α'-dimethylmuconic acid.
10. A composition according to claim 5 wherein the sun-screen agent is the dimethyl ester of α,α'-dimethylmuconic acid.
11. A composition according to claim 6 wherein the sun-screen agent is the dimethyl ester of α, α'-dimethylmuconic acid.
12. A method of protecting human skin against erythematogenic radiation which comprises applying to the surface of the area of skn to be protected a thin film of a composition as disclosed in claim 1 comprising a cosmetic lotion base carrier containing 1.0–15.0 weight per- cent of a sunscreen agent selected from the group consisting of
  (a) polymethylated muconic acids selected from the group consisting of $\alpha,\alpha'$-dimethylmuconic acid, $\alpha,\beta'$-dimethylmuconic acid, $\alpha,\alpha',\beta$-trimethylmuconic acid, $\alpha,\beta,\beta'$-trimethylmuconic acid, and $\alpha,\alpha',\beta,\beta'$-tetramethylmuconic acid,
  (b) hydrocarbyl monoesters of said muconic acids wherein the hydrocarbyl contains 1–20 carbon atoms and
  (c) hydrocarbyl diesters of said muconic acids wherein the hydrocarbyl groups each contain 1–20 carbon atoms.

References Cited

UNITED STATES PATENTS 3,383,289   5/1968   Raymond et al. _____ 195—28

OTHER REFERENCES

Elvidge, J. A., et al.: "J. Chem. Soc.," p. 1026–1033 (1952).

ALBERT T. MEYERS, Primary Examiner

V. D. TURNER, Assistant Examiner